(12) United States Patent
Recker (10) Patent No.: US 10,023,251 B2
(45) Date of Patent: Jul. 17, 2018

(54) TRACK ROLLER ASSEMBLY AND METHOD

(71) Applicant: Caterpillar Inc., Peoria, IL (US)

(72) Inventor: Roger L. Recker, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/192,933

(22) Filed: Jun. 24, 2016

(65) Prior Publication Data

US 2017/0369111 A1  Dec. 28, 2017

(51) Int. Cl.
| | |
|---|---|
| *B62D 55/32* | (2006.01) |
| *B62D 55/088* | (2006.01) |
| *B62D 55/092* | (2006.01) |
| *B62D 55/14* | (2006.01) |
| *B62D 55/15* | (2006.01) |
| B62D 55/06 | (2006.01) |
| B62D 55/08 | (2006.01) |
| E02F 3/32 | (2006.01) |

(52) U.S. Cl.
CPC .......... *B62D 55/32* (2013.01); *B62D 55/088* (2013.01); *B62D 55/092* (2013.01); *B62D 55/14* (2013.01); *B62D 55/15* (2013.01); *B62D 55/06* (2013.01); *B62D 55/08* (2013.01); *E02F 3/32* (2013.01)

(58) Field of Classification Search
CPC .... B62D 55/32; B62D 55/092; B62D 55/088; B62D 55/15; B62D 55/06; B62D 55/08
USPC ........ 305/100, 107, 117, 119, 136, 138, 139
See application file for complete search history.

(56) References Cited

U.S. PATENT DOCUMENTS

| | | | | |
|---|---|---|---|---|
| 3,843,214 | A  * | 10/1974 | Piepho ................... | B62D 55/15 305/119 |
| 6,364,438 | B1 | 4/2002 | Hasselbusch et al. | |
| 6,422,664 | B1 | 7/2002 | Hasselbusch et al. | |
| 6,435,629 | B1 | 8/2002 | Egle et al. | |
| 6,457,786 | B1 | 10/2002 | Maguire | |
| 6,857,786 | B2 * | 2/2005 | Csik ......................... | B60B 27/00 180/254 |
| 6,874,859 | B1 * | 4/2005 | Duse ...................... | B62D 55/15 305/136 |
| 2011/0121643 | A1 * | 5/2011 | Mulligan ............... | B62D 55/15 305/136 |

(Continued)

FOREIGN PATENT DOCUMENTS

| | | |
|---|---|---|
| CN | 204978925 U | 1/2016 |
| DE | 3540315 | 6/1986 |
| WO | 2016076027 | 5/2016 |

*Primary Examiner* — S. Joseph Morano
*Assistant Examiner* — Jean Charleston
(74) *Attorney, Agent, or Firm* — Miller, Matthias & Hull (57) ABSTRACT

A track roller assembly may have a track roller, a roller shaft and collars press fit onto either end of the roller shaft to retain the track roller on the roller shaft with an axial clearance between the collars and the track roller. During assembly, the collars may be press fit onto the shaft ends and forced axially inwardly until further axial movement of the collars is prevented by engagement shoulders of the track roller. A compressive axial load may be applied to the roller shaft to reduce a shaft length of the roller shaft and to cause the roller shaft to slide inwardly relative to the collars. The compressive axial load is removed from the roller shaft so that the roller shaft extends back to the normal shaft length and the collars move axially farther apart as the roller shaft extends back to the normal shaft length.

5 Claims, 7 Drawing Sheets

(56) References Cited

U.S. PATENT DOCUMENTS

2012/0146396 A1* 6/2012 Bubulka ................ B60B 35/08
  301/124.1
2012/0146397 A1 6/2012 Hisamatsu
2014/0125117 A1 5/2014 Weeks et al.

* cited by examiner

TRACK ROLLER ASSEMBLY AND METHOD

TECHNICAL FIELD

The present disclosure relates generally to track-type machines and, more particularly, to track roller assemblies for track-type machines and methods for fabricating track roller assemblies.

BACKGROUND

Track-type machines, such as excavators, bulldozers, track-loaders and skid-steer loaders, are used in a variety of applications. Generally speaking, these machines have an operator station, a power source, an undercarriage and a pair of track systems laterally flanking the machine. Each track system may include a roller frame positioned along a lengthwise-extending direction of the track-type machine, a drive sprocket mounted on the roller frame and rotatably driven by the power source, and one or more idler wheels also mounted for rotation on the roller frame. An endless track that circumscribes the drive sprocket and the one or more idler wheels. The endless track is engaged by the drive sprocket so the power source can drive the endless track over the drive sprocket and the idler wheels and propel the track type-machine over a work surface. To further separate the endless track from the roller frame and cause the endless track to have a desired shape for driving the track-type machine, known track systems typically include one or more upper and/or lower track roller assemblies. These track roller assemblies are located along the lengthwise-extending axis of the roller frame between the drive sprocket and the one or more idler wheels to force the endless track along the desired path.

The track roller assemblies may include a roller shaft mounted to the roller frame or to a support member to the track roller assembly, and a track roller having a through-bore may be rotatably mounted on the roller shaft. The roller shaft may be fixed in place and the track roller may rotate about the roller shaft when the track-type machine is in motion and the endless track passes over the track roller assembly. The track-type machine may operate in adverse environments wherein the track roller assemblies may be exposed to abrasive mixtures of water, dirt, sand, rock or other materials, and even chemical elements. These contaminants may enter a space between the roller shaft and the through-bore of the track roller and lead to wear of the surfaces of the roller shaft and the through-bore. Accordingly, track roller seals may be utilized to prevent the afore-mentioned contaminants from entering the space between the roller shaft and the through-bore, and to retain lubricant within the space between the roller shaft and the through-bore to minimize friction and wear in the track roller assembly.

Track roller seals of the type generally described above are known in the art. For example, U.S. Pat. No. 6,568,684 issued to Bedford et al. on May 27, 2003, and entitled "Method of Forming a Seal Assembly Around a Shaft," discloses a method for forming a seal assembly around a shaft. More specifically, a track roller seal utilizing two seal members engaging at a seal face limits ingress of contaminants into the track roller and mitigates leakage of lubricant from the track roller.

SUMMARY OF THE DISCLOSURE

In one aspect of the present disclosure, a method for assembling a track roller is disclosed. The method may include inserting a roller shaft having a shaft outer surface with a shaft outer diameter into a roller inner surface of the track roller having a varying roller inner diameter, wherein the shaft outer surface and the roller inner surface are configured so that the track roller can rotate about the roller shaft, and press fitting a first collar onto a first shaft end of the roller shaft and a second collar onto a second shaft end of the roller shaft, and forcing the first collar and the second collar axially inwardly until axially inward movement of the first collar is prevented by a first engagement shoulder of the track roller and axially inward movement of the second collar is prevented by a second engagement shoulder of the track roller. The method may further include applying a compressive axial load to the roller shaft to reduce a shaft length of the roller shaft from a normal shaft length to a compressed shaft length, wherein the roller shaft moves relatively inwardly relative to the first collar and the second collar, and removing the compressive axial load from the roller shaft so that the roller shaft extends back to the normal shaft length and the first collar and the second collar move axially farther apart as the roller shaft extends back to the normal shaft length.

In another aspect of the present disclosure, a roller assembly is disclosed. The roller assembly may include a track roller having a roller inner surface with a varying roller inner diameter, a roller shaft having shaft outer surface with a shaft outer diameter, wherein the shaft outer surface and the roller inner surface are configured so that the track roller can rotate about the roller shaft, a first collar that is press fit onto a first shaft end, and a second collar that is press fit onto a second shaft end. A collar axial clearance of the first collar and the second collar from the roller inner surface is created by compressing the roller shaft with a compressive axial load when the track roller prevents axial inward movement of the first collar and the second collar, and then removing the compressive axial load from the roller shaft to allow the first collar and the second collar to move axially outwardly as the roller shaft extends from a shaft compressed length to a shaft normal length.

In a further aspect of the present disclosure, a method for assembling a track roller is disclosed. The method may include press fitting a first flange bushing and a second flange bushing into a roller inner surface of the track roller having a varying roller inner diameter, wherein the first flange bushing has a first bushing body having a hollow cylindrical shape and a first bushing flange extending radially outwardly from a first bushing end, and the second flange bushing has a second bushing body having a hollow cylindrical shape and a second bushing flange extending radially outwardly from a second bushing end, wherein the first flange bushing and the second flange bushing are press fit axially inwardly until the first bushing flange engages a first engagement shoulder and the second bushing flange engages a second engagement shoulder. The method may further include inserting a roller shaft having a shaft outer surface with a shaft outer diameter into the roller inner surface of the track roller, wherein the shaft outer surface, the first bushing body and the second bushing body are configured to provide a shaft radial clearance so that the track roller can rotate about the roller shaft, press fitting a first collar onto a first shaft end of the roller shaft until a first collar inward end engages the first bushing flange and a second collar onto a second shaft end of the roller shaft until a second collar inward end engages the second bushing flange, applying a compressive axial load to the roller shaft to reduce a shaft length of the roller shaft from a normal shaft length to a compressed shaft length, wherein the roller shaft moves relatively inwardly relative to the first collar and the second collar, and removing the compressive axial load from the roller shaft so that the roller shaft extends back to the normal shaft length and the first collar and the second collar move axially farther apart as the roller shaft extends back to the normal shaft length.

Additional aspects are defined by the claims of this patent.

DETAILED DESCRIPTION

Figure 1A:
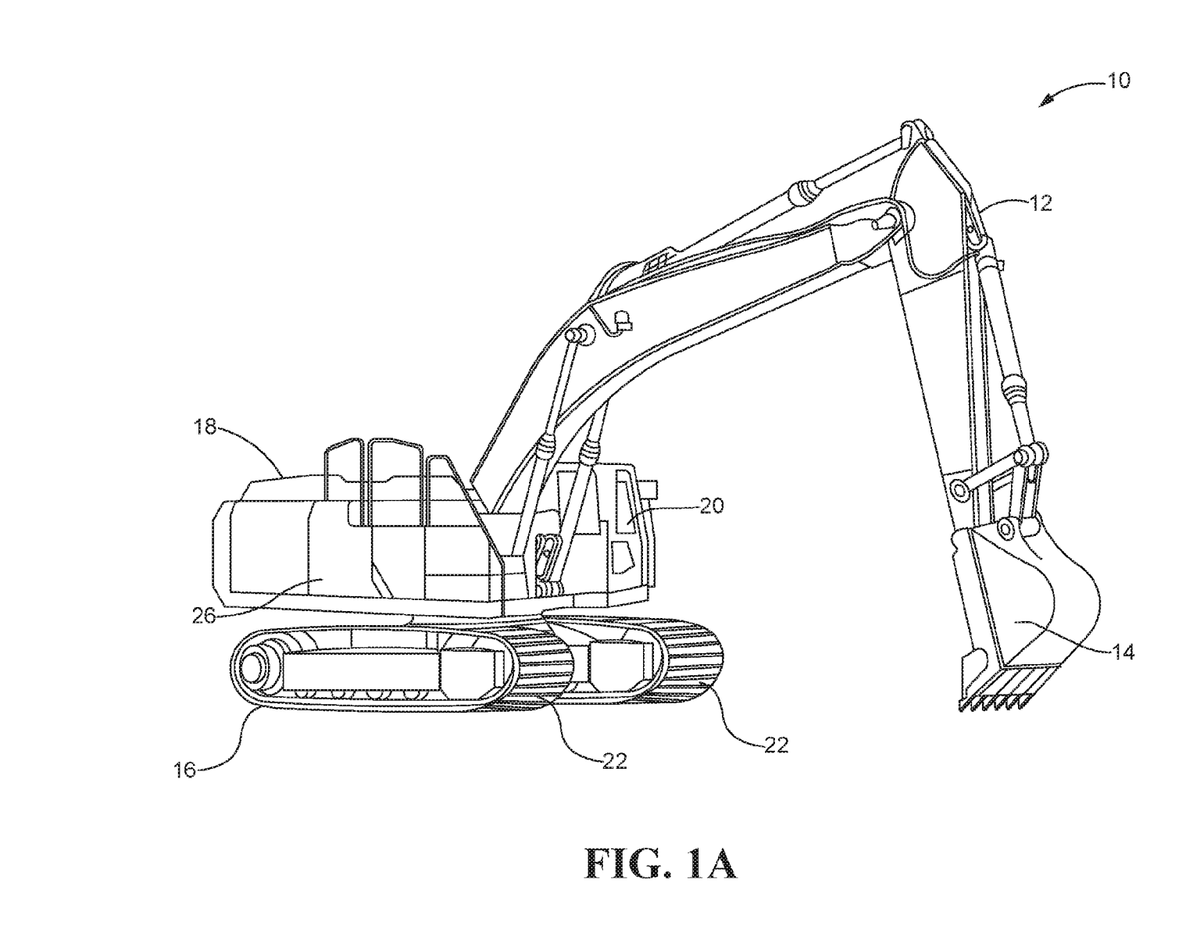
FIG. 1A is a perspective view of a track-type machine having track carrier rollers in accordance with the present disclosure.
Figure 1B:
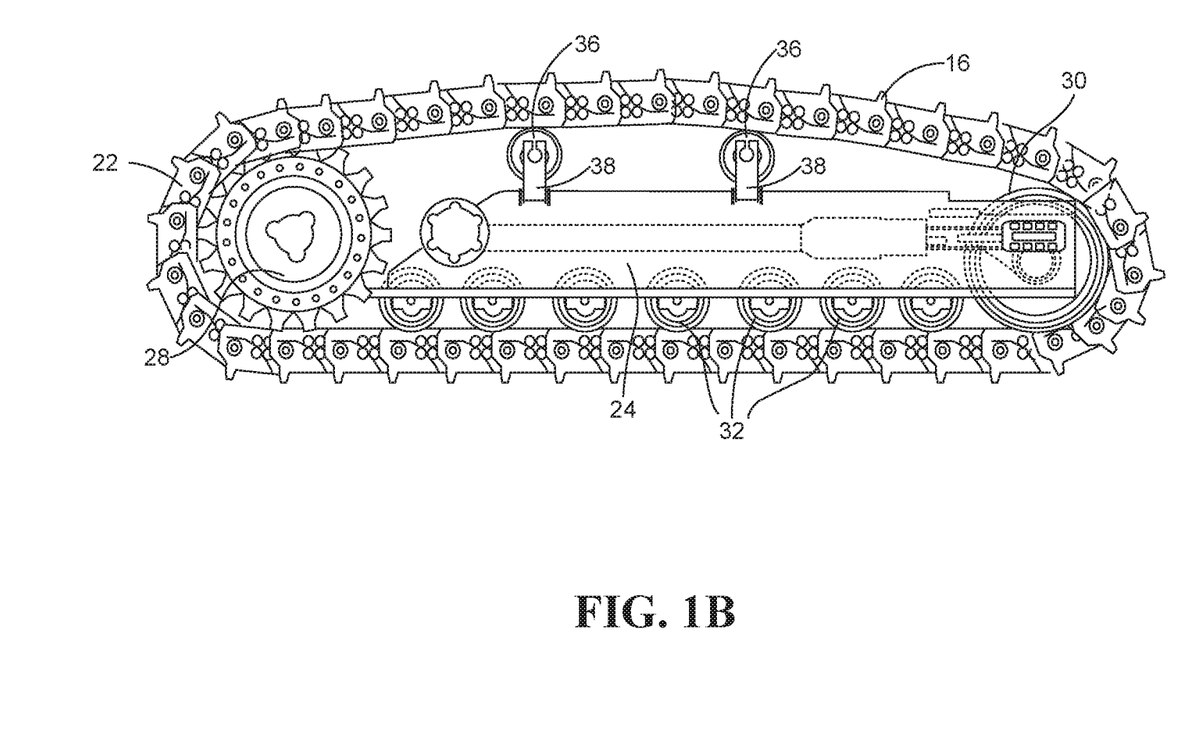
FIG. 1B is a side view of an undercarriage of the track-type machine of FIG. 1A.

Referring to FIGS. 1A and 1B, a track-type machine 10 may embody a mobile machine that performs some type of operation associated with an industry such as mining, construction, farming, transportation, waste handling or any other industry known in the art. For example, the machine 10 may be an earth moving machine such as a hydraulic excavator or other suitable machine. The machine 10 may include an implement system 12 configured to adjust the position or orientation of an implement such as a bucket 14, a drive system in the form of a track undercarriage 16 for propelling the machine 10, a power source 18 that provides power to the implement system 12 and the undercarriage 16, and an operator station 20 for operator control of the implement system 12 and the undercarriage 16. Though a hydraulic excavator is illustrated, the rollers disclosed herein may be implemented in any other types of machines having an undercarriage, such as material loaders, tractors and the like.

Power source 18 may embody an engine such as, for example, a diesel engine, a gasoline engine, a gaseous fuel-powered engine or any other type of combustion engine known in the art. It is contemplated that power source 18 may alternatively embody a non-combustion source of power such as a fuel cell, a power storage device, or another source known in the art. Power source 18 may produce a mechanical or electrical power output that may then be converted to hydraulic or pneumatic power for moving the implement system 12, and converted into drive torque by an appropriate power transmission assembly (not shown) to drive tracks 22 of the undercarriage 16.

The undercarriage 16 may be a standard track drive system known in the art and includes a roller frame 24 connected to a body 26 of the machine 10 and having a drive sprocket 28 and one or more idler pulleys 30 pivotally connected thereto. The track 22 is supported by the drive sprocket 28 and idler pulleys 30, but may not be taught so that the track 22 may move to provide stability for the machine 10 as it traverses uneven terrain. Track rollers 32 pivotally connected to the roller frame 24 support the machine 10 on the work surface. Above the roller frame 24, the portion of the track 22 between the drive sprocket 28 and front idler pulley 30 is supported by at least one carrier roller 36. The carrier roller 36 is rotatably mounted to a carrier stand 38 extending upwardly from the roller frame 24 so that the carrier roller 36 rotates as the track 22 moves between the drive sprocket 28 and the idler pulley 30. The undercarriage 16 illustrated herein is a low sprocket-type undercarriage, but those skilled in the art will understand that the concepts disclosed herein may be implemented in other types of undercarriage such as elevated sprocket undercarriages having a drive sprocket 28 mounted above the roller frame 24 and idler pulleys 30 at the front and rear of the roller frame 24.

Figure 2:
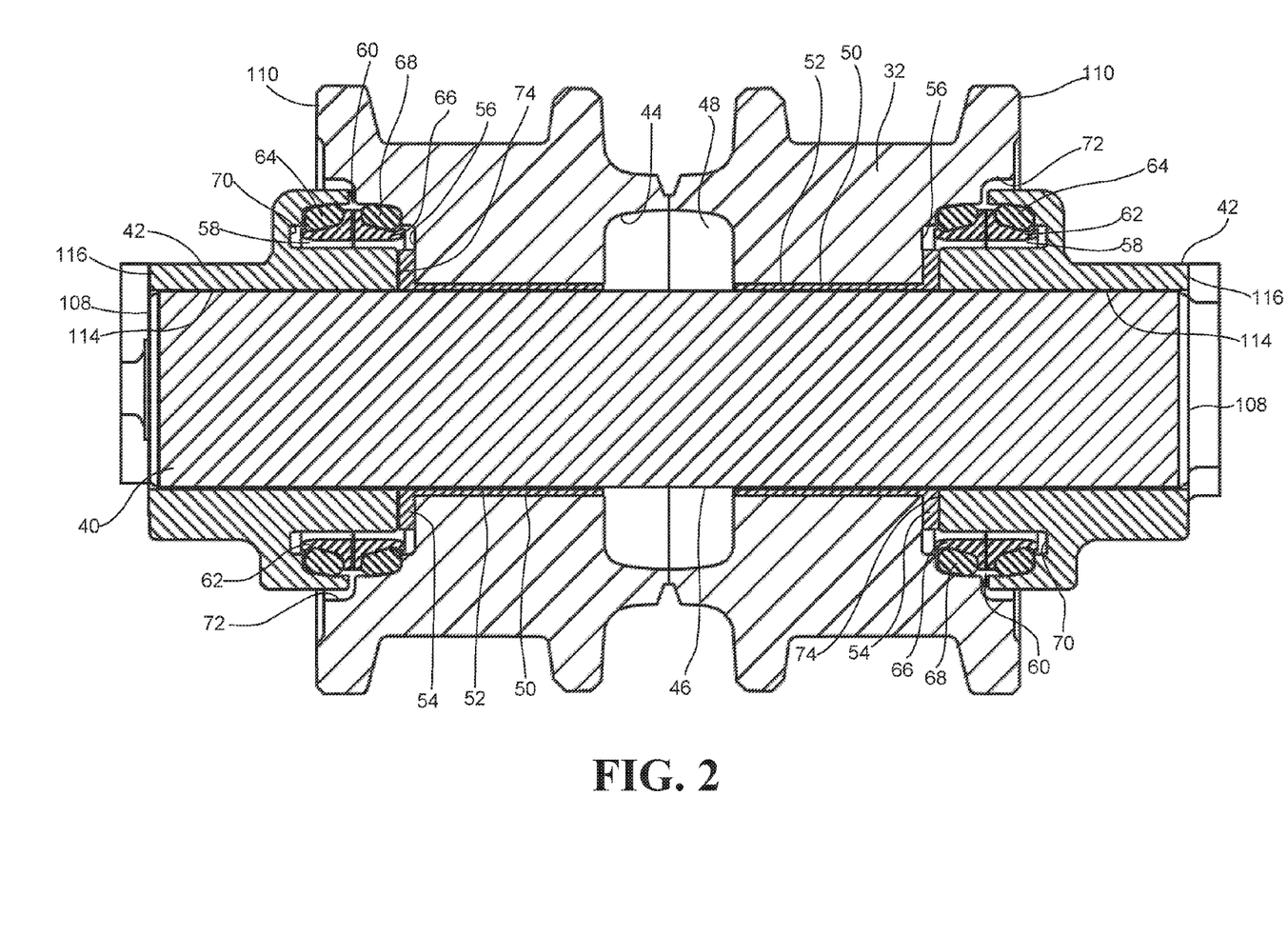
FIG. 2 is a cross-sectional view of a track roller assembly of the track-type machine of FIG. 1.

FIG. 2 illustrates an example of the track roller 32 that may be assembled according to an assembly routine in accordance with the present disclosure. The discussion herein may equally apply to the carrier roller 36 that may also be assembled according to the assembly routine. This configuration of roller collars, roller shafts and roller seals in the track rollers 32 and the carrier rollers 36 is exemplary only. The assembly routine in accordance with the present disclosure may be implemented in other rotating components mounted on a shaft, such as idler pulleys, sprockets and the like, that collectively are encompassed by the term "roller."

The track roller 32 is rotatably mounted to the roller frame 24 (or to the carrier stand 38 in the case of the carrier roller 36) by an axial roller shaft 40 extending through the track roller 32 and collars 42 that are press fit onto ends of the roller shaft 40 on either side of the track roller 32. In the illustrated embodiment, the roller shaft 40 does not extend beyond outward surfaces of the collars 42, and the collars 42 are engaged and retained by the roller frame 24 to hold the roller shaft 40 and the collars 42 against rotation relative to the roller frame 24 as the track roller 32 rotates about the roller shaft 40. In alternative embodiments, the roller shaft 40 may have an end extending beyond one of the collars 42 and attached to the roller frame 24 in a cantilevered arrangement, or the roller shaft 40 may extend out of both sides of the track roller 32 and collars 42 and be dually supported by the roller frame 24.

The track roller 32 has a roller inner surface 44 having a varying roller inner diameter, and the roller shaft 40 has a shaft outer surface 46 having a substantially uniform shaft outer diameter. Portions of the roller inner surface 44 and the shaft outer surface 46 define a lubricant reservoir 48 therebetween proximate a longitudinal center of the track roller 32 in which a lubricant such as oil or grease is disposed to lubricate the moving components of the track roller 32. The track roller 32 is rotatably mounted to the roller shaft 40 by bearings, such as a pair of flange bushings 50.

Each flange bushings 50 may have a cylindrical bushing body 52 and a bushing flange 54 extending radially outwardly from one end of the bushing body 52. The bushing body 52 may be a hollow cylinder having a bushing outer diameter causing an interference fit with a corresponding portion of the roller inner surface 44 that is longitudinally outward from the reservoir 48. The bushing body 52 is press fit into the corresponding portion of the roller inner surface 44 so that the flange bushing 50 will rotate with the track roller 32 about the roller shaft 40. A bushing inner diameter of the bushing body 52 and the bushing flange 54 is slightly greater than the shaft outer diameter to allow the track roller 32 and the flange bushings 50 to rotate relative to the roller shaft 40 with minimal radial movement relative to the roller shaft 40. The bushing inner diameter creates a radial clearance that may be on the order of approximately 0.25 mm (approximately 0.009843 inch) between a bushing inner surface and the shaft outer surface 46 allowing lubricant from the reservoir 48 to flow between the bushing body 52 and the roller shaft 40. The bushing flanges 54 have a flange outer diameter that is greater than roller inner diameter at the portions of the roller inner surface 44 into which the bushing bodies 52 are press fit. The roller inner surface 44 extends radially outwardly to define bushing engagement shoulders 56 that engage the bushing flanges 54 to properly position the flange bushings 50 along the roller inner surface 44.

The flange bushings 50 as illustrated having the bushing bodies 52 and the bushing flanges 54 formed as single unitary components. However, those skilled in the art will understand that the flange bushing 50 may be formed from multiple separate components that combine to perform the functions of the flange bushings 50 as described herein. For example, a cylindrical radial bearing may function as the bushing body 52 and be press fit into the corresponding portion of the roller inner surface 44 and have the bushing inner diameter that creates the radial clearance between a bushing inner surface and the shaft outer surface 46. A washer or other type of the thrust bearing may function as the bushing flange 54 and be disposed on the roller shaft 40 and between the bushing engagement shoulder 56 and the corresponding collars 42 to absorb thrust loads imparted on the track roller 32. Other configurations of bearings will be apparent when the term "flange bushing" is used herein.

The collars 42 and outward portions of the roller inner surface 44 combine to define seal cavities 58 at either end of the track roller 32 and the roller shaft 40. Seal assemblies 60 are disposed within the seal cavities 58 to form a seal between the components that are rotating relative to each other that retains the lubricant from the reservoir 48 within the track roller 32, and prevents dirt, sand and other debris from passing through the seal cavities 58 and wear on the parts moving relative to each other. In the illustrated embodiment, each seal assembly 60 has a collar side seal portion formed by a first seal ring 62 and a first toroidal seal member 64, and a roller side seal portion formed by a second seal ring 66 and a second toroidal seal member 68. The seal rings 62, 66 are positioned side-by-side and abutting with the first seal member 64 engaging a collar seal cavity surface 70 and the second seal member 66 engaging a roller seal cavity surface 72 of the roller inner surface 44. The collars 42 are press fit onto the roller shaft 40 in a position to form seals preventing the lubricant from passing between the seal rings 62, 66 and between the seal members 64, 68 and the seal cavity surfaces 70, 72, respectively. To provide lubricant from the reservoir 48 to the seal assemblies 60, axial clearance is provided between collar inward ends 74 of the collars 42 and the bushing flanges 54. The axial clearance between the collar inward ends 74 and the bushing flanges 54 may be approximately 0.25 mm (approximately 0.009843 inch) in one exemplary implementation, though the actual axial clearance may vary based on the particular implementation of the track rollers 32. Due to the constraints of illustration, the relatively small radial and axial clearances between the bushing bodies 52 and the roller shaft 40, and between the collar inward ends 74 and the bushing flanges 54 are not visually apparent in many of the drawings figures include herewith. However, those skilled in the art will understand that such radial and axial clearances are present between the parts. Where appropriate for the purpose of illustration, dimensions of the components are exaggerated for the benefit of the reader's understanding of the present disclosure.

Figure 3:
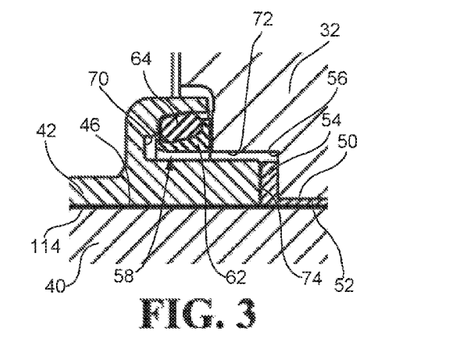
FIG. 3 is an enlarged portion of the cross-sectional view of FIG. 2 showing an alternative sealing arrangement in the track roller assembly.
Figure 4:
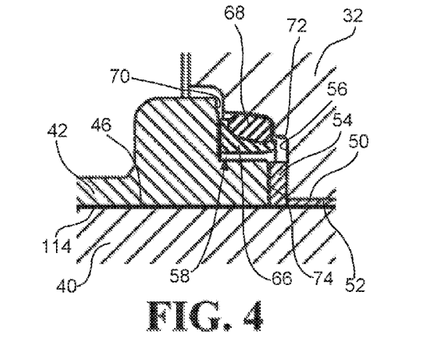
FIG. 4 is the enlarged portion of the cross-sectional view of FIG. 3 showing a further alternative sealing arrangement in the track roller assembly.

FIGS. 3-8 illustrate various alternative configurations of seal assemblies 60 that may be implemented in the track rollers 32 assembled in accordance with the present disclosure. Referring to FIG. 3, the roller seal cavity surface 72 may be modified so that a seal may be formed using only the first seal ring 62 and the first seal member 64 of the collar side seal portion. The first seal ring 62 faces and abuts the roller seal cavity surface 72 and the first seal member 64 is pressed against the collar seal cavity surface 70 to form seals there between. In FIG. 4, the collar seal cavity surface 70 is modified in a similar manner so that only the roller side seal portion consisting of the second seal ring 66 and the second seal member 68 is used to seal the seal cavity 58.

Figure 5:
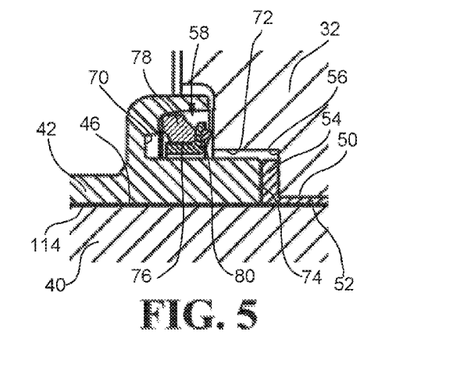
FIG. 5 is the enlarged portion of the cross-sectional view of FIG. 3 showing another alternative sealing arrangement in the track roller assembly.
Figure 6:
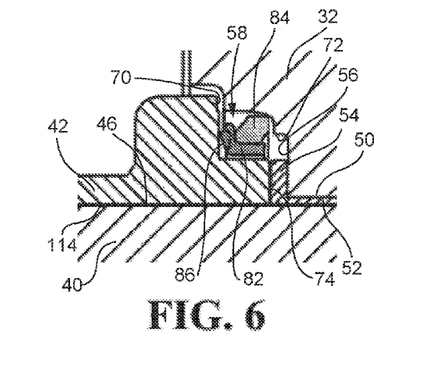
FIG. 6 is the enlarged portion of the cross-sectional view of FIG. 3 showing an additional alternative sealing arrangement in the track roller assembly.
Figure 7:
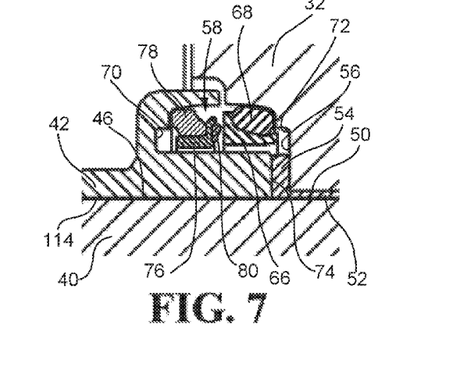
FIG. 7 is the enlarged portion of the cross-sectional view of FIG. 3 showing a still further alternative sealing arrangement in the track roller assembly.
Figure 8:
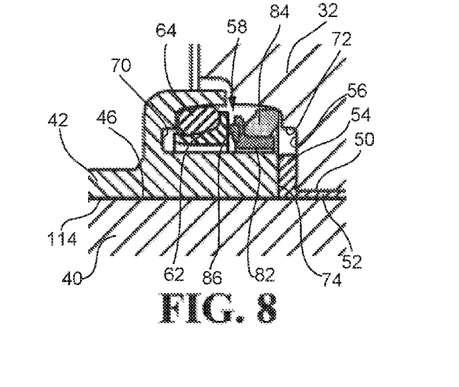
FIG. 8 is the enlarged portion of the cross-sectional view of FIG. 3 showing another alternative sealing arrangement in the track roller assembly.

The seal cavity surfaces 70, 72 are modified in a similar fashion in FIGS. 5 and 6, but an alternative side seal portion configuration may be installed within the seal cavity 58. Referring to FIG. 5, a collar side seal portion may be formed by a first seal ring 76 modified to receive a first load ring 78 on an outward side and a first sealing lip 80 on an inward side. The collar side seal portion is installed within the seal cavity 58 with the first load ring 78 engaging the collar seal cavity surface 70 and the first sealing lip engaging the roller seal cavity surface 72. In FIG. 6, a roller side seal portion may be formed by a second seal ring 82 modified to receive a second load ring 84 on an inward side and a second sealing lip 86 on an outward side, with the roller side seal portion is installed within the seal cavity 58 with the second load ring 84 engaging the roller seal cavity surface 72 and the second sealing lip engaging the collar seal cavity surface 70. FIGS. 7 and 8 illustrate further alternative embodiments where combinations of the side seal portion configurations are implemented together within the seal cavity 58.

In previously known track roller and carrier roller assemblies where collars are not press fit onto the roller shaft, the collars are instead secured to the roller shaft by dowel pins inserted through holes in the roller shaft and the collar. Because the collars are slidable on the roller shaft before the dowels are inserted, lubricant can leak between the roller shaft and the collar unless O-ring grooves are machined into the outer surface of the roller shaft or the inner surface of the collar and O-rings are installed to seal the interface. In such configurations and in the configurations described herein, it is desirable to maintain tight control over the axial clearance between the bushing flanges 54 and the collar inward ends 74 to minimize the axial motion of the track roller 32 along the roller shaft 40. Excessive axial motion can result in leakage at the seal assemblies 60 if the seal members 64, 68 or load rings 78, 84 disengage from the seal cavity surfaces 70, 72, the seal rings 62, 66 disengage from each other, or other separation occurs to comprise the seal assemblies 60. In the dowel-secured track rollers, the typical tolerance stack up for fabricating the dowels, the collars, the inner surface of the track roller and the flange bushings, and in machining the holes in the roller shaft and the collar can make the required axial clearance for the seal assemblies 60 of FIGS. 3-8 unachievable.

Tolerance stack up in the components of the seal assemblies 60 further increases the likelihood that a reliable seal cannot be formed. For example, in the dowel arrangement discussed above, tolerance stack up may allow for a total axial clearance between the bushing flanges 54 and the collar inward ends 74 within a range from approximately 0.50 mm (approximately 0.01969 inch) to approximately 1.50 mm (approximately 0.05906 inch) using typical tolerances for the manufactured components. Tighter control over the tolerances in the fabrication of the components of the track rollers 32 is possible, but the use of such controls for these components is cost prohibitive.

Figure 9:
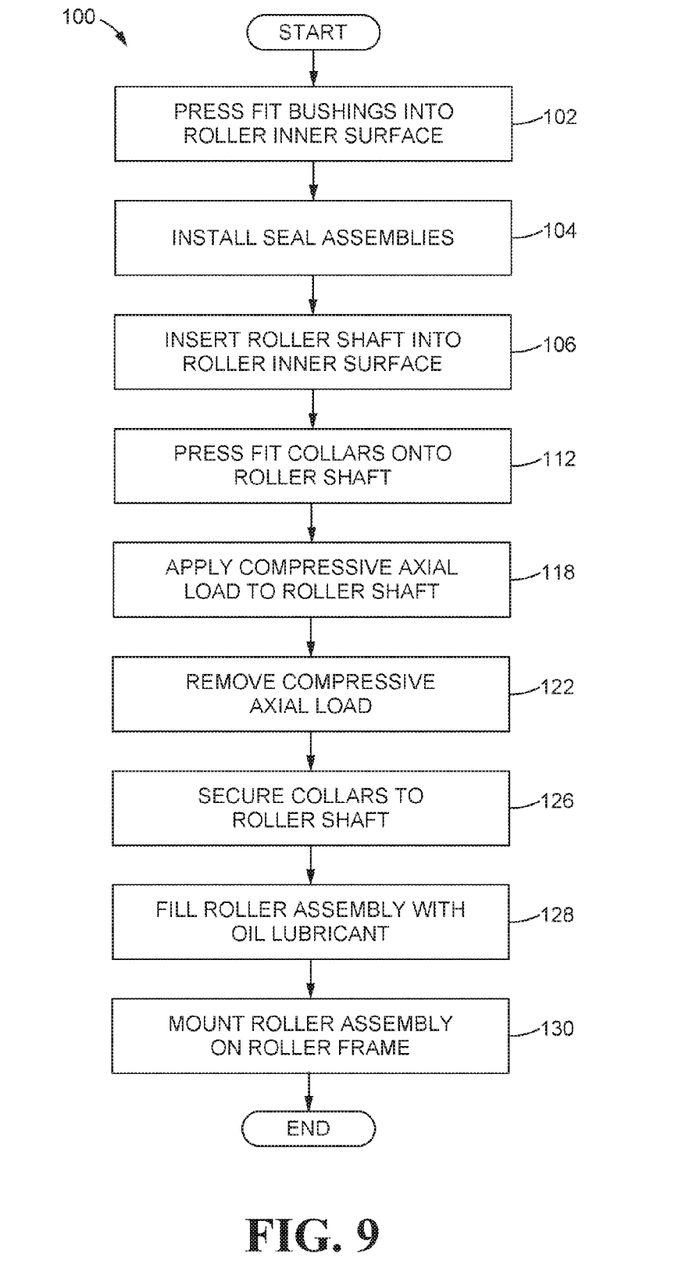
FIG. 9 is a flow diagram of a track roller assembly routine in accordance with the present disclosure.

FIG. 9 illustrates an embodiment of a track roller assembly routine 100 that may more reliably position the collar inward ends 74 of the collars 42 relative to the bushing flanges 54 to achieve the desired axial clearance there between for flow of lubricant without excessive and undesired axial movement of the track roller 32 along the roller shaft 40. The track roller assembly routine 100 may begin at a block 102 where the flange bushings 50 are press fit into the corresponding portions of the roller inner surface 44. The bushing bodies 52 are pressed into the corresponding portions of the roller inner surface 44 until the bushing flanges 54 are engaged by the bushing engagement shoulders 56 of the roller inner surface 44.

With the flange bushings installed 50 at the block 102, control of the routine 100 may pass to a block 104 where the side seal portions of the seal assemblies 60 are installed within the collar seal cavity surface 70 and/or the roller seal cavity surface 72 depending on the particular configuration of the seal assemblies 60, such as those shown in FIGS. 2-8 or other seal assembly arrangements that may be used in a particular implementation. When inserted, the engagement between the seal members 64, 68 or the load rings 78, 84 and the seal cavity surfaces 70, 72 will align the seal rings 62, 66, 76, 82 approximately concentrically with the track roller 32 and the collar 42 to facilitate insertion of the roller shaft 40 and the collars 42.

After the side seal portions are installed in the track roller 32 and/or the collars 42, control may pass to a block 106 where the roller shaft 40 is inserted into the roller inner surface 44 of the track roller 32. The radial clearance between the shaft outer surface 46 and the bushing body 52 allows the roller shaft 40 to slide into the track roller 32. The roller shaft 40 is positioned relative to the track roller 32 so that shaft ends 108 of the roller shaft 40 extend beyond corresponding roller ends 110 of the track roller 32. This positioning will allow for the collars 42 to be installed on the roller shaft 40.

Figure 10:
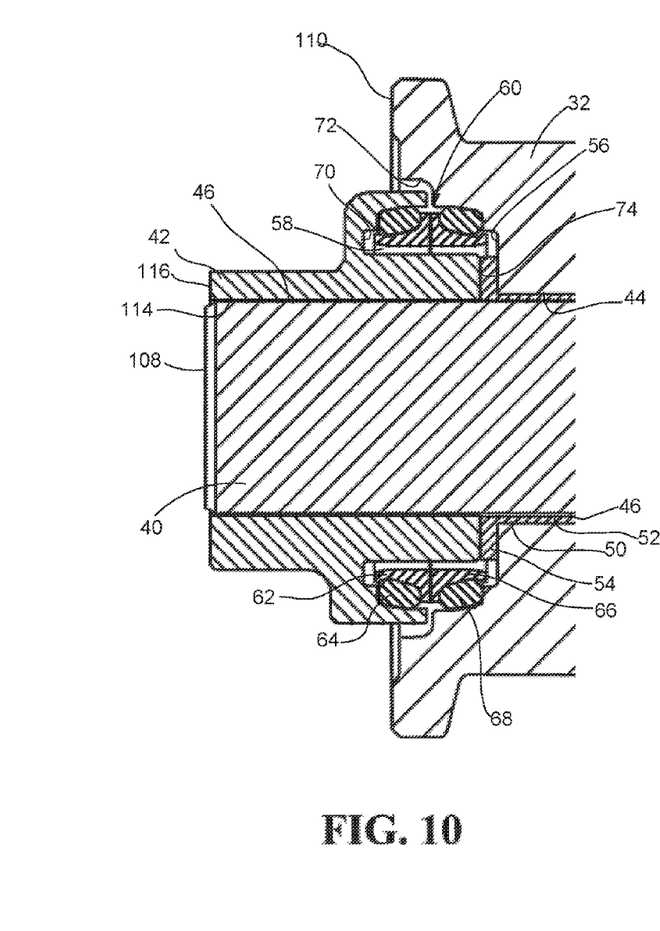
FIG. 10 is an enlarged cross-sectional view of the left portion of the track roller assembly of FIG. 2 during assembly prior to compressive of a roller shaft.

At a block 112, the collars 42 are installed on the corresponding shaft ends 108 of the roller shaft 40. A collar inner diameter of collar inner surfaces 114 is dimensioned to create an interference fit with the shaft outer surface 46 so that the collars 42 must be press fit onto the roller shaft 40. At this point of the assembly process, the collars 42 are pressed axially inwardly until the collar inward ends 74 abut the corresponding bushing flanges 54, thereby leaving no axial clearance between the collars 42 and the flange bushings 50 as shown in FIG. 10. With the collars 42 abutting the flange bushings 50, the collars 42 are positioned axially inwardly on the roller shaft 40 relative to their final assembled position that will provide axial clearance from the bushing flanges 54. Consequently, for purposes of illustration, the shaft ends 108 may extend beyond collar outward ends 116 of the collars 42 in preparation for adjusting the positions of the collars 42 on the roller shaft 40.

Figure 11:
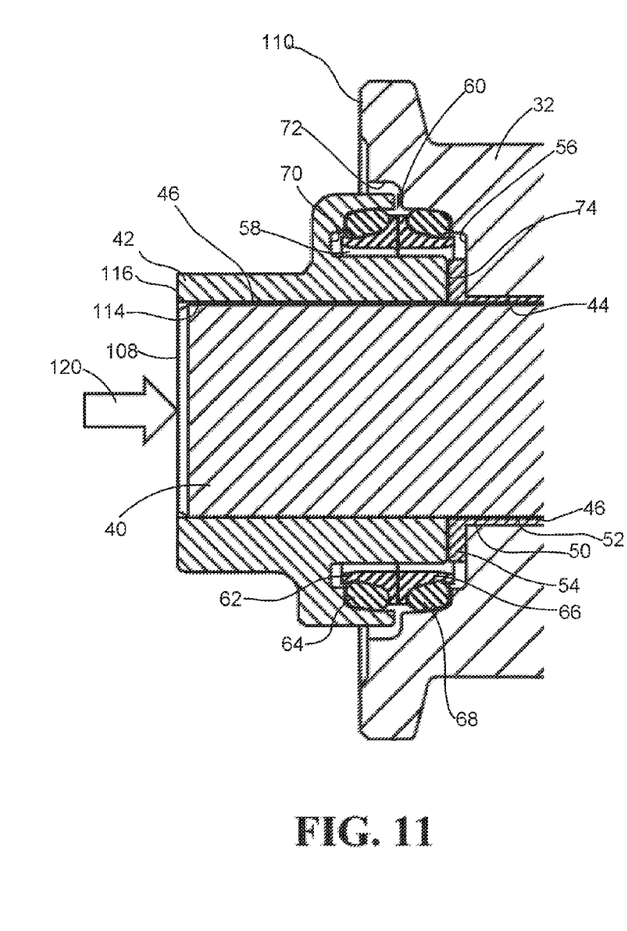
FIG. 11 is the enlarged cross-sectional view of FIG. 10 during application of a compressive axial load on the roller shaft.

With the collars 42 installed on the roller shaft 40, control may pass to a block 118 where a compressive axial load 120 is applied to the shaft ends 108 of the roller shaft 40 as shown in FIG. 11. The compressive axial load 120 has a sufficient magnitude to compress and shorten the length of the roller shaft 40. Because the collars 42 are engaged with the flange bushings 50 to prevent inward axial movement of the collars 42, the shaft outer surface 46 will slide relative to the collar inner surfaces 114 as the roller shaft 40 shortens. The compressive axial load 120 has a desired shaft compressive load value that will compress the roller shaft 40 by an amount approximately equal to two times the specified axial clearance distance between the collar inward ends 74 and the bushing flanges 54. For example, if the specified axial clearance distance between one of the collar inward ends 74 and the corresponding bushing flange 54 is 0.25 mm (0.009843 inch), the shaft compressive load value may be the compressive load necessary to compress the roller shaft 40 by 0.50 mm (0.01969 inch) to account for two collar-to-bushing axial clearances. In the illustrated embodiment, the compressive axial load 120 may be sufficient to compress the roller shaft 40 until the roller ends 110 are flush with the corresponding collar outward ends 116. In alternate embodiments, one or both of the roller ends 110 may extend beyond the collar outward ends 116 before and after the roller shaft 40 is compressed. The magnitude of the compressive load will vary based on factors such as the length and outer diameter of the roller shaft 40 and the material from which the roller shaft 40 is fabricated, the inner diameter of the collar inner surfaces 114 and corresponding frictional force between the surfaces 46, 114 resisting relative axial movement between the roller shaft 40 and the collars 42, and the like.

After the roller shaft 40 is compressed and displaced relative to the collars 42 at the block 118, control of the assembly routine 100 may pass to a block 122 where the compressive axial load 120 is removed from the roller shaft 40. When the compressive load is removed from the roller shaft 40, the roller shaft 40 extends in the axial direction and returns to its normal length that it had before the compressive axial load 120 was applied. Due to the interference fit between the roller shaft 40 and the collars 42 and the absence of any constraint on the collars 42 from move axially outwardly relative to the track roller 32, the collars 42 will move with the roller shaft 40 as it extends so that a distance between the collars 42 increases by the amount that the roller shaft 40 was shortened in the axial direction. Consequently, in the above example, the collars 42 will be separated by an additional approximately 0.50 mm (approximately 0.01969 inch) after the roller shaft 40 returns to its normal length while the collar outward ends 116 remain flush with the shaft ends 108.

Figure 12:
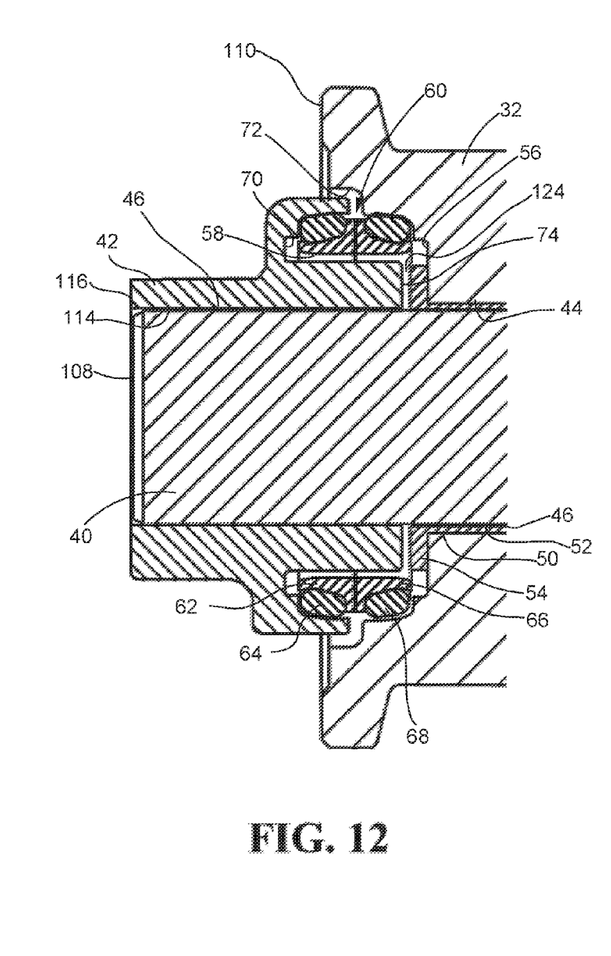
FIG. 12 is the enlarged cross-sectional view of FIG. 10 after the compressive axial load is removed from the roller shaft.

The additional separation of the collars 42 will provide axial clearance between the bushing flanges 54 and the collar inward ends 74 so that gaps 124 (shown with the distance exaggerated for the purpose of illustration in FIG. 12) will exist between the collars 42 and the flange bushings 50. The radial clearance between the shaft outer surface 46 and the bushing body 52 will allow for relative axial movement between the track roller 32 and the roller shaft 40 by an amount equal to the increased separation between the collars 42, so the width of the gaps 124 will vary between no separation when one collar inward end 74 contacts the corresponding bushing flange 54 to a maximum of the increased separation distance. Of course, the distance of the gap 124 will vary between the extremes as the track roller 32 operates to guide the endless track 22 around the roller frame 24.

With the compressive axial load 120 removed, and the roller shaft 40 returned to its normal length and the collars 42 positioned, control may pass to a block 126 where the collars 42 are secured to their respective shaft ends 108. The roller shaft 40 and the collars 42 may be secured using any appropriate attachment method or mechanism for preventing relative movement between the roller shaft 40 and the collars 42. For example, cold metal transfer (CMT), controlled short circuit (CSC), laser or other type of welding may be used. Alternatively, an additional connection component such as a swage ring can be included in the assembly. Other mechanisms capable of maintaining the collars 42 in the positions established when the compressive axial load 120 is removed will be apparent to those skilled in the art and are contemplated by the inventor.

Once the track roller 32, the roller shaft 40 and the collars 42 are assembled, control may pass to a block 128 where the roller assembly is filled with lubricant. The track roller 32 may include a lubricant opening (not shown) extending through the track roller 32 to fluidly connect the lubricant reservoir 48 to the ambient atmosphere surrounding the track roller 32. Lubricant may be added to the lubricant reservoir 48 through the lubricant opening, which is then sealed by a threaded plug (not shown) or other appropriate closing mechanism. The lubricant in the lubricant reservoir 48 may then flow past the flange bushings 50 to the seal cavities 58. At this point, the roller assembly is ready for installation and control may pass to a block 160 where the roller shaft 40 and/or the collars 42 are mounted to the roller frame 24, bogie 34 or other support structure. Regardless of the support structure, the roller shaft 40 or the collars 42 are secured to prevent movement relative to the support structure. At the same time, the track roller 32 is free to rotate about the roller shaft 40 to guide the endless track 22.

INDUSTRIAL APPLICABILITY

The configuration of the track roller 32, the roller shaft 40 and the collars 42 and the accompanying assembly routine 100 provide tighter tolerance matching for the axial clearance between the collars 42 and the flange bushings 50. Tolerance stack in the radial clearance is substantially eliminated as the compression and length reduction of the roller shaft 40 is the only parameter affecting the additional spacing distance between the collars 42 after press fitting and being placed into engagement with the bushing flanges 54. As a result, the machining processes for the other components of the assembly, and in particular the components of the seal assemblies 60, do not require as precise control of tolerances in order to maintain the seals in the seal cavities 58. Consequently, the machine costs for the assembly may be significantly reduces.

The configuration also eliminates some components and corresponding machining processes in their entirety. Dowels are no longer necessary for retaining the collars 42 in position relative to the roller shaft 40. Without dowels, machining processes for forming dowel holes in the roller shaft 40 and the collars 42 are eliminated from the fabrication process. Additionally, the interference fits between the shaft outer surface 46 and the collar inner surfaces 114 may be sufficient to prevent leakage of lubricant. Consequently, O-ring seals and machining processes for the corresponding O-ring grooves are eliminated from the design. These reductions can result in further reducing the cost of the roller assemblies.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A roller assembly comprising:
    a track roller having a roller inner surface with a varying roller inner diameter;
    a roller shaft having shaft outer surface with a shaft outer diameter, wherein the shaft outer surface and the roller inner surface are configured so that the track roller can rotate about the roller shaft;
    a first collar that is press fit onto a first shaft end; and
    a second collar that is press fit onto a second shaft end, wherein a collar axial clearance of the first collar and the second collar from the roller inner surface is created by compressing the roller shaft with a compressive axial load after the first collar has been pressed onto the first shaft end and the second collar has been pressed onto the second shaft end when the track roller prevents axial inward movement of the first collar and the second collar, and then removing the compressive axial load from the roller shaft to allow the first collar and the second collar to move axially outwardly as the roller shaft extends from a shaft compressed length to a shaft normal length.

2. The roller assembly of claim 1, wherein the track roller and the first collar define a first seal cavity and the track roller and the second collar define a second seal cavity, the roller assembly comprising:
    a first seal assembly disposed within the first seal cavity; and
    a second seal assembly disposed within the second seal cavity.

3. The roller assembly of claim 1, comprising:
    a first flange bushing having a first bushing body having a hollow cylindrical shape and a first bushing flange extending radially outwardly from a first bushing end, wherein the first flange bushing is press fit into the roller inner surface until the first bushing flange engages a first engagement shoulder of the roller inner surface, and the first collar is press fit onto the roller shaft until a first collar inward end engages the first bushing flange; and a second flange bushing having a second bushing body having a hollow cylindrical shape and a second bushing flange extending radially outwardly from a second bushing end, wherein the second flange bushing is press fit into the roller inner surface until the second bushing flange engages a second engagement shoulder of the roller inner surface, and the second collar is press fit onto the roller shaft until a second collar inward end engages the second bushing flange.

4. The roller assembly of claim 1, wherein applying and removing the compressive axial load increases a collar separation distance by approximately 0.50 mm (approximately 0.01969 inch).

5. The roller assembly of claim 1, wherein the roller inner surface and the shaft outer surface define a lubricant reservoir proximate a longitudinal center of the track roller.

* * * * *